United States Patent [19]

Dziurla et al.

[11] Patent Number: 4,876,033

[45] Date of Patent: Oct. 24, 1989

[54] MOULDED BODIES CONTAINING CARBON

[75] Inventors: Heinz-Jürgen Dziurla, Leverkusen; Dieter Freitag, Krefeld; Werner Waldenrath, Cologne; Claus Burkhardt; Bernhard Schulte, both of Krefeld, all of Fed. Rep. of Germany

[73] Assignee: Bayer Aktiengesellschaft, Leverkusen, Bayerwerk, Fed. Rep. of Germany

[21] Appl. No.: 185,606

[22] Filed: Apr. 25, 1988

Related U.S. Application Data

[63] Continuation-in-part of Ser. No. 55,675, May 29, 1987, abandoned.

[30] Foreign Application Priority Data

| Jun. 10, 1986 | [DE] | Fed. Rep. of Germany ....... 3619094 |
| May 29, 1987 | [EP] | European Pat. Off. ............ 87107784 |
| Jun. 10, 1987 | [JP] | Japan ................................. 62-143419 |

[51] Int. Cl.$^4$ ............................ C08J 3/20; C08K 3/04
[52] U.S. Cl. .................................. 252/511; 523/351; 524/496; 524/537
[58] Field of Search ................ 252/511; 524/496, 537; 525/439; 523/351

[56] References Cited

U.S. PATENT DOCUMENTS

| 3,035,955 | 5/1962 | Zucker ................................. 252/511 |
| 3,218,372 | 11/1965 | Okamura et al. .................... 260/860 |
| 4,161,469 | 7/1979 | LeGrand et al. ................... 260/525 |
| 4,351,745 | 9/1982 | Stinger ................................ 252/511 |
| 4,515,925 | 5/1985 | Kleiner et al. ...................... 525/439 |
| 4,559,164 | 12/1985 | Kostelnik ............................ 252/511 |
| 4,596,670 | 6/1986 | Liu ...................................... 252/511 |
| 4,599,262 | 7/1986 | Schulte et al. ...................... 428/215 |

FOREIGN PATENT DOCUMENTS

| 0120394 | 3/1984 | European Pat. Off. . |
| 0141310 | 10/1984 | European Pat. Off. . |
| 0209033 | 1/1987 | European Pat. Off. . |
| 4854160 | 7/1973 | Japan . |
| 4981062 | 8/1974 | Japan . |
| 136652 | 8/1983 | Japan . |
| 155459 | 9/1984 | Japan . |

*Primary Examiner*—Lewis T. Jacobs
*Assistant Examiner*—David Buttner
*Attorney, Agent, or Firm*—Gene Harsh; Joseph C. Gil; Aron Preis

[57] ABSTRACT

This invention relates to carbon-containing moulded bodies based on thermoplastic polycarbonates and thermoplastic polyalkylene terephtalates with an addition of carbon black and graphite and to a process for the production of these moulded bodies.

8 Claims, No Drawings

MOULDED BODIES CONTAINING CARBON

This application is a continuation-in-part-application of U.S. application Ser. No. 055675, filed May 29, 1987, now abandoned.

This invention relates to carbon-containing moulded bodies produced by the extrusion process or by the injection moulding process, characterised in that they contain (a) 40 to 85% by weight of thermoplastic polycarbonates, (b) 35 to 5% by weight of thermoplastic polyalkylene terephthalates and (c) 35 to 10% by weight, preferably 30 to 15% by wieght of carbon black and graphite, in which the ratio by weight of carbon black to graphite is in the range of 5:1 to 1:3, preferably from 3:2 to 2:3, and the sum of percentages of weight of components (a)+(b)+(c) is in all cases 100% by weight.

The moulded bodies according to this invention include, for example, extrusion cast sheets and injection moulded articles of all kinds. They are distinguished by their antistatic behaviour up to a certain conductivity and by their great toughness, tensile strength at break and dimensional stability in the heat. The moulded products according to the invention are therefore suitable, for example, for the packaging of electronic measuring instruments or electronic structural parts, especially those which are at risk from the accumulation of electrostatic charges, for example, in computers, television receivers, etc.

The invention also relates to a process for the production of moulded bodies containing carbon, characterised in that the thermoplastic polycarbonate is intimately mixed with the carbon black and graphite and the whole mixture is extruded or injection moulded after the addition of the thermoplastic polyalkylene terphthalate to produce the desired moulded article.

The invention also relates to the carbon-containing moulded bodies obtainable by the process according to the invention.

According to U.S. Pat. No. 3,218,372 mixture of polycarbonates with polyalkylene terephthalates are known. From these mixtures films can be obtained (Col. 4, line 9 of U.S. Pat. No. 3,218,372). The addition of carbon black or graphite is not mentioned.

According to JA-PS No. 932,197 mixtures of 50 parts by weight or more of polycarbonates and 50 parts by weight or less of polybutylene terephthalates are known. Fillers like carbon black, $TiO_2$, glass fibers etc. and other dyeing pigments can be added. The preparation of films is not mentioned.

According to Japanese patent application No. 47/121,683 films from mixtures consisting of 100 parts by weight of polycarbonate produced from bisphenol-A and 10 to 70 parts by weight of polytetramethylene terephthalate are claimed. Pigments, dyestuffs or an inorganic or organic additive such as stabilizer, filler or the like can be added. Carbon black or graphite are not mentioned, neither as fillers nor as pigments. According to the U.S. Pat. No. 4,559,164 electrically conductive poly(butylene-terephthalate) mouldings and compositions therefor are known. The carbon used can be some type of carbon black or graphite or combinations thereof. (Col. 2, line 13 ff. of the U.S. Pat. No. 4,559,164). The amount of carbon is between 10 and 25% by weight of the composition. (Col. 1, lines 65/67). Moreover, the total composition can contain 1 to 50% by weight of bisphenol-A-polycarbonate (claim 1 of U.S. Pat. No. 4,559,164).

The thermoplastic polycarbonates used for the present invention may be polycondensates obtained by the reaction of diphenols, in particular dihydroxydiarylalkanes, with phosgenes or diesters of carbonic acid. The dihydroxydiarylalkanes used may be either the unsubstituted compounds or compounds in which the aryl groups carry methyl groups or halogen atoms in the ortho- and/or meta-position to the hydroxyl group. Branched chain polycarbonates are also suitable.

The thermoplastic polycarbonates used here have average molecular weights $M_w$ in the range of from 22,000 to 50,000, preferably from 28,000 to 40,000, determined by measurements of the relative viscosity in $CH_2Cl_2$ at 25° C. and at a concentration of 0.5 g per 100 ml.

The following are examples of suitable diphenols: Hydroquinone, resorcinol, 4,4'-dihydroxydiphenyl, bis-(hydroxyphenl)-alkanes such as, for example, $C_1$–$C_8$-alkylene-bisphenols or $C_2$–$C_8$-alkylidene-bisphenols, bis-(hydroxy-phenyl)-cycloalkanes such as $C_5$–$C_{15}$-cycloalkylene-bisphenols or $C_5$–$C_{15}$-cycloalkylidene-bisphenols and bis-(hydroxyphenyl)-sulphides, -ethers, -ketons, -sulphoxides and -sulphones; also, $\alpha,\alpha'$-bis-(hydroxyphenyl)-diisopropylbenzene and the corresponding compounds which are alkylated or haloganted in the nucleus. It is preferred to use polycarbonates based on bis-(4-hydroxyphenyl)-propane-(2,2) (bisphenol A), bis-(4-hydroxy-3,5-dichlorophenyl)-propane-(2,2) (tetrachlorobisphenol A), bis-(4-hydroxy-3,5-dibromophenyl)-propane(2,2) (tetrabromobisphenol A), bis-(4-hydroxy-3,5-dimethylphenyl)-propane-(2,2) (tetramethylbisphenol A), bis-(4-hydroxyphenyl)-cyclohexane-(1,1) (bisphenol Z) and on trinuclearbisphenols such as $\alpha,\alpha'$-bis(4-hydroxy-phenyl)-p-diisopropylbenzene.

Other diphenols suitable for the preparation of the polycarbonates are described in U.S. Pat. Nos. 2,970,131, 2,991,273, 2,999,835, 2,999,846, 3,028,365, 3,062,781, 3,148,172, 3,271,367 and 3,275,601.

The aromatic polycarbonates may be branched in known manner by the incorporation of small quantities, preferably from 0.05 to 2.0 mol-% (based on the quantity of diphenols) of trifunctional or higher functional compounds, in particular compounds containing three or more than three phenolic hydroxyl groups.

Polycarbonates of this kind are described, for example, in German Offenlegungsschriften No. 1,570,533 and 1,595,762, British Pat. No. 1,079,821, U.S. Pat. No. Re 27,682 and German Pat. No. 2,500,092.

The following are some examples of suitable compounds containing three or more than three phenolic hydroxyl groups: 2,4-Bis-(hydroxyphenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis(4,4''-dihydroxytriphenylmethyl)-benzene.

The following are further examples of trifunctional compounds: 2,4-dihydroxybenzoic acid, trimesic acid, cyanuric chloride and 3,3-bis-(4-hydroxy-3-methylphenyl)-2-oxo-2,3-dihydroindole isatin-bis cresol).

Thermoplastic polalkylene terephthalates within the meaning of this invention are polyesters of terephthalic acid and an aliphatic diol, preferably from the group of butane-1-4-diol, ethanediol and cyclohexane-1,4-dimethanol, especially butane-1,4-diol.

In addition to the glycol groups mentioned above the aforesaid terephthalates may contain up to 30 mol-% of residues of other aliphatic diols containing 3 to 12 carbon atoms or cycloaliphatic diols containing 6 to 21 carbon atoms, e.g. those based on propane-1,3-diol, neopentyl glycol, pentane-1,5diol, hexane-1,6-diol, 3-methylpentane-2,4-diol, 2-methylpentane-2,4-diol and 2,2,4-trimethylpentane-1,3-diol.

In addition to terephthalic acid esters, the products may contain up to 15 mol-% of residues of other dicarboxylic acids, e.g. isophthalic acid, adipic acid, succinic acid, sebacic acid, naphthalene-2,6-dicarboxylic acid, diphenylcarboxylic acid, azelaic acid or cyclohexanediacetic acid. The polyalkylene glycol terephthalates may be prepared by known methods, for example from dialkyterephthalates and the corresponding diol by ester interchange (see e.g. U.S. Pat. Nos. 2,647,885, 2,643,989, 2,534,028, 2,578,660, 2,742,494 and 2,901,466). A lower alkyl ester of terephthalic acid, preferably the dimethylester, may be used as starting material which may be reacted with an excess of diol in the presence of suitable catalysts for transesterification to the bishydroxyalkylester of terephthalic acid. In this process, the temperature is raised from 140° C. to 210°-220° C. and the alcohol liberated is distilled off. Condensation is then carried out at a temperature of 210°-180° C. while the pressure is lowered stepwise to below 1 Torr so that excess diol is distilled off.

The molecular weights $M_w$ of the terephthalates are in the range of from 30,000 to 80,000 and the molecular weights $M_w$ of the copolyesters of terephthalic and isophthalic acid are also in the range of from 30,000 to 80,000. The $M_w$ is determined measuring the intrinsic viscosity (limiting viscosity number, value of the reduced specific viscosity extrapolated to 0) I.V. in phenyl/o-dichlorobenzene (1/1) at 25° C., using a 5% solution, or it may be determined from the RSV-value (reduced specific viscosity) which is the specific viscosisty divided by the concentration of the solution used for the measurement. The RSV-value is determined on a 23% solution in phenol/tetrachloroethane (60/40) at 20° C. The I.V. values are generally in the region of 0.85 to 1.25.

Polybutylene terephthalates with $M_w$ values in the range of 30,000 to 60,000 are particularly preferred aliphatic thermoplastic polyesters. The carbon blacks used for the purpose of this invention may be gas black, furnace black or flame black with average primary particle sizes below 200 Nanometer (nm), preferably below 100 Nanometer (nm) and in particular with an average primary particle size of less than 50 Nanometer, generally determined by electron microscope.

The graphites used for the purpose of this invention may be graphite powder or graphite dust which is available in a wide range of particle sizes with particles of up to 5 mm, for example as electrode graphite, while the graphite powder used generally has an average particle size of up to 1 mm, preferably up to 0.5 mm.

The carbon blacks used are preferably so-called conductivity carbon blacks which not only have a very small primary particle size but also a large external and internal surface area, i.e., a high porosity and therefore high BET surfaces available for nitrogen adsorption and high dibutylphthalate (DBP) adsorption values. In addition, they are highly structured, i.e. they have a strong tendency to agglomeration or aggregation of individual particles to form larger structures, e.g. in the form of chains. The BET surface areas of the carbon blacks are generally greater than 20 m²/g and the DBP adsorption is generally above 40 ml per 100 g of carbon black. Conductivity carbon blacks with BET surfaces above 50 m²/g and DBP adsorptions greater than 80 ml/100 g and average primary particle sizes below 50 nanometers (nm) are particularly siutable. Electronically conductive carbon blacks of this kind are commercially available as special grade carbon blacks with a pronounced structure and high electrical conductivity.

Mixing of the carbon black and graphite with the thermoplastic polycarbonate may be carried out, for example, by the usual methods of powder mixing employed in the art, e.e. the polycarbonate powder may be intimately mixed with carbon black and graphite at room temperature and then extruded through an extruder at about 250° to about 300° C. to form a granulate.

Alternatively, the polycarbonate may be mixed with the carbon black and graphite by putting measured quantities of the components through suitable kneaders and directly granulating the mixture obtained. The temperatures for this method are again maintained at about 250° to 300° C. but granulation must be carried out in a vacuum which is produced by means of a degassing apparatus.

The mixtures of polycarbonate, carbon black and granphite, which are obtained in the form of granulates as described above, are generally extruded with the thermoplastic polyalkylene terphthalate in conventional degassing extruders to produce extrusion moulded parts such as extruded sheets, profiles, plates or blown articles. The extrusion process is generally carried out at a temperature in the range of about 220° to 280° C.

Injection moulding of the granulate of polycarbonat, carbon black and graphite described above with the thermoplastic polyalkylene terephthalate and optionally other thermoplastic polycarbonates is generally carried out at temperatures in the range of aobut 270° C. to about 300° C. in conventional injection moulding apparatus.

The whole mixture should preferably contain at least 15% by weight of thermoplastic polyalkylene terphthalates, based on the total weight of components (a)+(b)+(c).

The present invention therefore also relates to carbon-containing moulded bodies produced by the injection moulding process, characterised in that they contain (a) 40 to 75% by weight of thermoplastic polycarbonates, (b) 35 to 15% by weight of thermoplastic polyalkylene terephthalates and (c) 35 to 10% by weight, preferably 30 to 15% by weight, of carbon black and graphite, in which the ratio by weight of carbon black to graphite should be in the range of from 5:1 to 1:3, preferably from 3:2 to 2:3, and the sum of percentages by weight is 100.

Alternatively, the polyalkylene terephthalate may be added to the mixture of polycarbonate, carbon black and graphite without a granulate being first formed from the mixture, and the compounds may then be directly extruded or injection moulded as described above. This method is, however, less convenient as regards the ease of handling the components.

In another variation of the process, addition of the polyalkylene terphtalate may be carried out immediately after or even together with the process of mixing the polycarbonate with carbon black and graphite, and the resulting mixture may then be worked up into a granulate, either by means of extrusion as described above or by agglomeration in the known agglomerators, before the product is extruded to form the moulded products such as sheets or injection moulded as described above. In this variation of the process, therefore, thermoplastic processing of the polyalkylene terephthalate is carried out twice.

Mixtures of thermoplastic polycarbonates and thermoplastic polyalkylene terephtalates and moulded articles and sheets produced from them are known (see, for example, EP-OS No. 0,120,394 (Le A No. 22,232-EP), EP-OS No. 0,143,352 (Le A No. 22 591-EP) and EP-OS No. 0,106,225 (Le A No. 21,855-EP) and the literature quoted in and for these European Offenlegungsschriften).

Polycarbonate sheets containing carbon black or graphite are known (see, for example, EP-OS No. 0,143,352 (Le A No. 22,591) and EP-OS No. 0,141,310 (Le A 22,590) and the literature quoted in and for these European Offenlegungschriften).

The combined use of carbon black and graphite in polyether ester elastomers has been described in EP-OS No. 0,032,375.

The known stabilizers against heat, moisture and air used for thermoplastic polycarbonates and thermoplastic polyalkylene terephtalates may be added to the thermoplastic polycarbonates and the thermoplastic polyalkylene terephtalates.

EXAMPLES

Method of preparation of basic compounds

From a bisphenol-A/polycarbonate granulate $\eta_{rel}$ 1300, stabilized with 0.07% by weight of tris-(2-ethyl-oxetanyl-2)-methyl-phophite, and conductive carbon black (the carbon blacks should have a very small primary particle size and a large external and internal surface area, i.e. high porosity and therefore large BET surfaces for $N_2$ adsorption and high dibutylphthalate (DBP) adsorption values and they should be highly structured, i.e. they should have a strong tendency to agglomeration of individual particles to form larger structures, e.g. chains, and the BET surface area of the carbon blacks should generally be greater than 20 m²/g and the DBP adsorption should be above 40 ml per 100 g of carbon black) and graphite powder (the graphite powder should have an average particle size of up to 1 mm, preferably and especially up to 0.5 mm), the basis compound is prepared in a compounding extruder by the dosed introduction of the polycarbonate, carbon black and graphite under degassing conditions.

The temperature in the melting region of the compounding extruder is 280° C.

The granulate obtained from this process, hereinafter referred to as basic compound 1.1 and basic compound 2.1, is used for the extrusion of sheets or for injection moulding.

1. Production of an antistatic extruded sheet
1.1 Preparation of the basic compound as described above from

| polycarbonate | 80% by weight |
| carbon black | 12% by weight and |
| graphite | 8% by weight. |

1.2 For the preparation of a granulates mixture for the production of sheets, polybutylene terphthalate is added to this basic compound in proportions of 5:1 in suitable mixing apparatus (tumbler mixers or conical screw mixer) and after thorough mixing, the sheet is directly extruded from this granulate mixture.

The extrusion temperature should be in the range of 230°–260° C. on account of the addition of polybutylene terephthalate. The temperature of the subsequent smoothing apparatus (applicator roller for sheet extrusion) should be kept at or below 60° C. in order to avoid crystallisation in the sheet. The sheet obtained has the following composition:

| polycarbonate | 66.66% by weight, |
| polybutylene terephthalate | 16.66% by weight, |
| conductive carbon black | 9.99% by weight and |
| graphite | 6.69% by weight. |

A. Mechanical characteristics of 1.2

| Tests | Units | Test regulation | |
|---|---|---|---|
| Tensile strength at break | MPa | ISO/R 527 | 66 |
| Elongation on tearing | % | DIN 53 455 | 6 |
| Tensile stress at yield | MPa | DIN 53 455 | 69 |
| Density | g/cm² | | 1.28 |

B. Electrical properties of 1.2

| Specific surface resistance pS | $10^4$ Ohm |
| Specific volume resistance pD | $10^2$ Ohm.cm |

2. Production of a conductive extrusion sheet

The starting material for the production of a conductive extrusion sheet is again a basic compound prepared by the method of preparation given for basic compounds.

The proportions of polycarbonate, carbon black and graphite in the mixture were adjusted to the following composition:

2.1 Preparation of the basic compound from

| polycarbonate | 70% by weight |
| conductive carbon black | 18% by weight |
| graphite | 12% by weight |

2.2 For the production of extrusion sheet, 80% by weight of basic compound 2.1 are mixed with 20% by weight of polybutylene terephthalate and the mixture is extruded to a sheet as described under 1.2.

The sheet obtained has the following composition:

| polycarbonate | 56.00% by weight |
| polybutylene terephthalate | 20.00% by weight |
| conductive carbon black | 14.40% by weight |
| graphite | 9.60% by weight. |

3. Preparation of antistatic injection moulding compounds

The starting materials used for the preparation of the antistatic injection moulding compounds are the two basic compounds 1:1 and 2.1 which are mixed with 20% by weight or 30% by weight of polybutylene terephtalate, depending on the antistatic properties required. Processing temperature: 260° C.–280° C.

3.1 Composition of the injection moulding compounds from basic compound 1.1

| polycarbonate | 64.00% by weight, |
|---|---|
| polybutylene terephthalate | 20.00% by weight, |
| conductive carbon black | 9.60% by weight and |
| graphite | 6.40% by weight |

3.2 Composition of the injection moulding compound obtained from basic compound 2.1 (now outside the scope of the claims of the CIP)

| polycarbonate | 49.00% by weight, |
|---|---|
| polybutylene terephthalate | 30.00% by weight, |
| conductive carbon black | 12.60% by weight and |
| graphite | 8.40% by weight. |

Especially the instant invention relates to carbon-containing moulded bodies produced by extrusion or by injection moulding and comprising (a) 55% by weight to 85% by weight of thermoplastic polycarbonate, (b) 30% by weight to 5% by weight of thermoplastic polyalkylene terephthalate and (c) 35% by weight to 10% by weight of carbon black and graphite, in which the ratio by weight of carbon black to graphite is in the range of from 5:1 to 1:3 and the sum of percentages by weight of components (a)+(b)+(c) is 100% by weight.

It is understood that if component (b) is 30% by weight, component (c) can be only up to 15% by weight; also it is understood that if component (c) is 35% by weight, component (b) can be only up to 10% by weight, referred always to 100% by weight of the sum of (a)+(b)+(c).

The relationship of the carbon black and the graphite is of some importance for the properties of the bodies of the instant invention because, if the ratio carbon black to graphite is above 5:1, the incorporation into the polycarbonate becomes difficult, and if the ratio carbon black to graphite is below 1:3, the effect of the incorporated amount of carbon is reduced.

It is understood that these latter specially mentioned moulded bodies comprising the components (a), (b) and (c) can be prepared by the same different processes mentioned in the body of instant specification.

We claim:

1. A process for the production of articles comprising
   (i) intimately mixing a thermoplastic polycarbonate with a first mixture of carbon black and graphite powder or dust to produce a second mixture,
   (ii) working up said second mixture under degassing conditions to produce a granulate,
   (iii) mixing said granulate with a thermoplastic polyalkylene terephthalate to produce a blend,
   (iv) molding said blend by extrusion or by injection, said blend comprising 55 to 85% thermoplastic polycarbonate, 5 to 30% polyalkylene terephthalate and 10 to 35% said first mixture, said first mixture being characterized in that the weight ratio of said carbon black to said graphite is in the range of from 5:1 to 1:3 and said graphite being characterized in that its average particle size is up to 5 mm.

2. Carbon-containing moulded bodies produced by the process of claim 1 and comprising:
   (a) 55% by weight to 85% by weight of thermoplastic polycarbonate,
   (b) 30% by weight to 5% by weight of thermoplastic polyalkylene terephthalate, and
   (c) 35% by weight to 10% by weight of carbon black and graphite,
   in which the ratio by weight of carbon black to graphite is in the range of from 5:1 to 1:3 and the sum of percentages by weight of components (a)+(b)+(c) is 100% by weight.

3. Moulded bodies according to claim 2, in which the ratio by weight of carbon black to graphite is in the range of from 3:2 to 2:3.

4. The process of claim 1 wherein said average particle size is up to 1 mm.

5. The process of claim 1 wherein said polyalkylene terephthalate is present in said blend in an amount of 15 to 30% by weight.

6. The process of claim 1 wherein said weight ratio is in the range of 3:2 to 2:3.

7. A molded article produced by the process of claim 5.

8. A molded article produced by the process of claim 6.

* * * * *